July 19, 1927.

C. W. LARNER 1,636,662

VALVE

Filed Feb. 25, 1922     3 Sheets-Sheet 1

INVENTOR
Chester W. Larner
BY Edwards, Sager & Bower
his ATTORNEYS

Patented July 19, 1927.

1,636,662

UNITED STATES PATENT OFFICE.

CHESTER W. LARNER, OF PHILADELPHIA, PENNSYLVANIA, ASSIGNOR, BY DIRECT AND MESNE ASSIGNMENTS, TO I. P. MORRIS CORPORATION, A CORPORATION OF DELAWARE.

VALVE.

Application filed February 25, 1922. Serial No. 539,161.

This invention relates to valves and particularly to a valve moved by the fluid pressure of the fluid which it controls. In the operation of such valves there are often variations in pressure occurring in the fluid way during the movement of the valve and these tend to interfere with the control of the valve movement. Particularly in connection with valves for steam or other elastic fluid these variations sometimes set up serious vibrations and hammering of the valve preventing the proper operation of the valve.

The object of this invention is to overcome these objections and provide a valve which while movable by the fluid pressure of its controlled fluid will not be unfavorably affected by variations therein. In the valve structure of this invention the fluid pressure supply for the valve movement is drawn from the conduit flow at an area of substantially constant flow conditions irrespective of pressure variations or the degree of valve opening so that the operating pressure will not be subjected to extreme pressure variations. The valve also may be permitted to have a limited free movement of its own adapting it to automatically shift to meet and counteract any pressure variations without setting up serious vibration or hammering.

In the embodiments of the invention shown in the accompanying drawings,

Fig. 1 is a vertical sectional view of a valve structure illustrating the invention, and Figs. 2 to 8 are similar views of modifications.

In the embodiment of the invention shown in Fig. 1 an outer conduit casing A supports an inner cylinder B by ribs 10 so as to leave an annular waterway C between them, and a valve plunger 11 having a tapering nose 12 slides in the cylinder B and seats against the ring 13 forming part of the contracted end of the casing A. The flow is normally from left to right and pressure for closing movements of the plunger 11 is admitted to the space within the cylinder and plunger from the fluidway as by opening 14 or a leakage space around the plunger, which space or opening is limited in size so that the internal pressure may be reduced below conduit pressure to give opening movements of the plunger by the pressure and reaction of the conduit fluid against the outer end surface of the plunger. To effect this reduction of the internal pressure a discharge connection is provided from the interior space to a point of low pressure and this connection is adjustable so as to control the valve by exhausting pressure faster than it is supplied through the opening 14 or permitting any desired pressure to develop in the interior of the plunger to balance it or move it in another direction. In the valve of Fig. 1, this low pressure connection is provided by port 15 in partition 16 and by chamber 17 and the series of orifices 18 through the plunger 11 near its seating ring. This connection is made adjustable in size by control of the port 15 by pilot valve 20 on stem 21 sliding in bearing 22 and moved by the rack 23 from pinion 24, the shaft 25 of which extends to the outside of the conduit for operation by any suitable means such as a hand wheel.

The pressure supply to the interior of the plunger is substantially constant and varies only with the general conduit pressure. The pressure exhaust however, opens into the conduit below the valve seat and this portion of the conduit is subjected to pressure variations which are apt to be large particularly during the initial opening movement of the valve plunger and when this portion of the conduit is not completely filled. To prevent the full force of these pressure variations from being communicated to the interior chamber 5 of the valve plunger the openings 18 of the discharge connection are located on the diagonal face of the plunger and pointing in a direction normal to the direction of flow. Assuming that either a liquid or a gas is passing through the valve in the direction of the arrow, the orifices 18 will allow free communication between chamber 17 and the main valve passage C. When pilot valve 20 is in the wide open position as shown the pressure in the interior chamber 5 will be essentially the same as the pressure in chamber 17. The pressure supplied at port 14 will pass through chamber 5, port 15, chamber 17 and ports 18. When closing the valve the pilot valve 20 closes off port 15, thus pocketing pressure in chamber 5 and the plunger will move toward the closed position due to the accumulated internal pressure which is greater than the reduced pressure on the plunger nose. When the plunger is being used for throttling purposes or even in the ordinary opening and closing operation there may be certain sudden changes of pressure at the nose of the plunger, this being caused by a sudden deformation of the jet as it is leaving the plunger. An orifice located in the nose of the plunger and pointing in a direction axial with the flow is subjected to the sudden changes which occur at the nose; hence, these same sudden changes would be communicated directly to the operating chamber. When the orifice in the nose is replaced by the orifices 18 located in the diagonal face of the plunger and pointing normal to the direction of flow the sudden changes in pressure in the operating chamber are negligible in intensity or may be eliminated entirely. The direction of flow opposite ports 18 does not materially change, no matter whether the valve is only cracked open or is wide open. Furthermore, there is no appreciable deformation of the jet at this point. A slight opening of the valve plunger will result in a sheet of water traveling down the diagonal face of the plunger and converging at the nose where its direction is changed. A further opening of the valve simply makes the sheet of water thicker but does not result in any serious deformation opposite ports 18.

The position of ports 18 normal to the direction of flow not only avoids sudden changes of pressure in chamber 5 but also eliminates the ejector action of a port in the plunger nose axial with the stream. The axial port results in the formation of a vacuum or partial vacuum condition in chamber 5 when the plunger and pilot valve are wide open. Under these conditions, in the case of a fluid, air is liberated and accumulates in chamber 5. Ports 18 are the same as piezometers. It is not intended to limit their position to that shown on the drawing as they may be located nearer the nose of the plunger. They may also point slightly into the stream if it is desirable to increase the relative unit pressure in chamber 5. A slight pitch away from the stream would decrease the unit pressure as the conditions would approach the axial port, and in this way a proper positioning and inclination of ports 18 will give a desired pressure in the chamber 5.

In the case of a gas, the ports 18 should be located in a position where they are subjected to as little sudden change of pressure as possible, for the reason that the pressure in chamber 5 cannot be altered instantly to correspond to a sudden change at the ports 18. The relative position of pilot valve 20 and port 15 normally maintains the proper balance of pressure on the two sides of the plunger.

In the case of a fluid, a sudden change in pressure occurring on the outside of the plunger would result in an equally sudden change in chamber 5, since a liquid is practically incompressible. In the case of a gas, however, the pressure in chamber 5 cannot change instantly as the compressible nature of a gas requires a certain period of time to alter its pressure in any confined chamber such as 5; therefore, the location of ports 8 in a position where sudden changes are not prevalent is to be desired particularly in the case of a gas.

In Fig. 2, a modification is shown to allow for a certain amount of lap or free movement in the action of the pilot valve with respect to the plunger. In this case the cylindrical extension 26 of the pilot valve 27 is small enough to just pass through port 15 and therefore the pilot valve does not actually seat on port 15 until the shoulder 28 of the pilot valve touches the corresponding seat 29, and a separate cap piece B' is provided on the end of cylinder B to house the increased length of the rack 23'. If in the case of a gas the changes of pressure on the nose of the plunger are slow the cylindrical portion 26 of the pilot valve 27 will not pass through port 15 but will suffice to cut off communication through port 15 as soon as the end of the pilot valve passes seat 29; hence, the plunger will move toward the closed position the same as in the Fig. 1 valve.

Assuming that a sudden increase of pressure occurs against the nose 12 of the plunger 11, this pressure increase will tend to open the plunger and port 15 will be closed by the pilot valve. An accumulation of pressure instantly begins in chamber 5 through port 14 and, in the case of a gas, the plunger 11 will continue to open until the pressure in chamber 5 is sufficient to stop its further motion. The lap $p$ of the pilot valve allows this additional movement of the plunger while pressure is building up in chamber 5. A sudden decrease in pressure against the nose of the plunger would result in a closing motion, due to the fact that the pressure in chamber 5 must be lowered. Here again a time element is desired to allow the lowering of the pressure in chamber 5 through port 15 and ports 18. The portion $t$ of the pilot valve stroke is considerably longer than need be to allow free communication through port 15 and hence the pilot valve 27 may move toward the closed position, due to the excessive length of stroke $t$ before the shoulder 28 of the pilot valve hits the guide bearing at 29.

In Fig. 3, a modification is shown in which the pilot valve 30 has its stem 31 guided by a cylinder 32 which is connected directly to the plunger by means of ribs 33. A loosely fitting piston 34 is fastened to pilot valve stem 31 and a head 35 is provided for cylinder 32. The purpose of this combination is to incorporate a dash-pot action between the plunger and the pilot valve. For any given setting of the pilot valve 30 with relation to port 15 a change of this setting cannot occur without altering the position of piston 34 with relation to the ends of cylinder 32; hence, a sudden change in pressure against the nose of the plunger would attempt to alter the setting of pilot valve 30 with relation to the plunger, but would be temporarily restrained from so doing by the dash-pot action of piston 34. This would allow a certain time element for the changing of pressure in chamber 5, which is desirable particularly in the case of a gas. It would also tend to prevent serious oscillation of the plunger due to changes of pressure which might occur synchronously with such oscillations.

A further modification is shown in Fig. 4 in which the plunger 41 is smaller at the front end 42 than at the back end 43, with the result that an annular chamber 45 exists between the internal cylinder $b$ and the plunger. The annular chamber 45 will act by leakage as an operating chamber for opening the plunger and it will also act as a dash-pot similar to the design shown in Fig. 3. If a sudden drop in pressure occurs against the nose of the plunger the existing pressure in chamber 5 will tend to move the plunger 41 toward the closed position. Such motion of the plunger will open port 15 and pressure therefore will be discharged out of chamber 5, bringing the plunger to rest. In the case of a gas, however, it is desirable to provide a time element or in some manner restrain the plunger from responding to the expansive force of the gas. It will be seen that as the plunger moves toward the closed position the gas in chamber 45 will be compressed while the gas in chamber 5 is expanding; likewise, a tendency for the plunger to move open would result in a compression of the gas in chamber 5 and an expansion of the gas in chamber 45. The expansion of gas in one chamber is resisted by the compression of gas in the other chamber with the result that the plunger is restrained from moving suddenly in response to a change in pressure.

On account of the passage of the gas through the clearance spaces between the plunger and the internal cylinder a certain amount of dirt or foreign matter might accumulate in chamber 45; hence, an annular chamber 16 is provided and is connected to a point outside of the valve body. A blow-off cock 47 is attached to this connection for the purpose of discharging any accumulation of foreign matter which may exist. It will be seen that when the plunger is closed chamber 45 is reduced to a mere clearance space and with the plunger in this position blow-off cock 47 may be opened and the resulting flow of steam through the clearance spaces will tend to carry all foreign matter out of chamber 45.

The construction shown in Fig. 2 involving the valve extension 26 is incorporated as at $n$ in the designs shown in Figs. 3 and 4 by providing the freedom for oscillation of the plunger which may be desirable in combination with the dash-pot action to damp such oscillation.

In the foregoing Figs. 1 to 4 the operation of the pilot valve has no hydraulic effect upon the movement of the plunger except by discharging pressure through the nose of the plunger. It does not attempt to control the entrance of pressure into the internal chamber and the reduction of pressure is effected by opening up an outlet or area considerably larger than that of the inlet. In the modification shown in Fig. 5, the discharge through the plunger is retained and at the same time control of the entrance of pressure to the internal chamber (excepting, of course, the entrance of pressure through the clearance around the plunger which cannot be manipulated). It will be readily seen that the double acting arrangement is more positive than the single acting could be because it is now possible to make the opening in the back end of the internal cylinder as large as the opening through the plunger and yet when it is desired to drop pressure in the internal cylinder the inlet of pressure can be, if necessary, entirely shut off, at the same time securing the maximum area of outlet. This adds to the positiveness of a valve of this type, whether used with a liquid or a gas and at the same time is of especial benefit in connection with a gas valve because a slight movement of the plunger relative to the pilot valve produces a much quicker and more positive or powerful corrective action within the internal cylinder and overcomes oscillation of the plunger with respect to the pilot valve sufficient to cause the plunger to strike against the pilot valve, resulting in an objectionable hammering. The reason for this is that the change of pressure within the plunger tending to correct these erratic movements may not occur quickly enough or in sufficient magnitude to stop the movement of the plunger with the Figs. 1 to 4 type of control. A quicker change of pressure for a slight movement of the plunger relative to the pilot valve will hold the plunger stationary, or practically so. In this modification shown in Fig. 5, the stem 51 of pilot valve 52 is made hollow or tubular, extending through the back end of the internal cylinder $B''$ with a sliding fit and having at the front end a solid plug 52 which first closes the aperture 15 with a sliding fit and then actually seats to make the valve tight. At the front end of stem 51 are ports 54 which in the position shown are covered and effectually cut off by the bearing 55 which is part of the plunger 58 and travels with it. The stem 51 in the position shown is not as far back as it will go; it can still be drawn back a certain distance $d$ until the shoulder strokes against bearing 55, thus locking the plunger open mechanically. The object of providing this lap or lost motion $d$ is the same as the object of providing the extension 50 at the front end of the pilot valve which enters aperture 15. This lost motion on each side of shoulder 56 permits the plunger at intermediate positions to oscillate more or less without shoulder 56 striking against either aperture 15 or bearing 55 and causing an objectionable hammering.

If it is desired to close the plunger, as the stem is moved forward ports 54 are gradually uncovered and at the same time valve 52 approaches port 15. It is, of course, merely a matter of design whether valve 50 begins to throttle port 15 before ports 54 are entirely uncovered, or whether ports 54 are completely uncovered before valve 50 begins to restrict the flow out of port 15. The effect upon the pressure within the plunger will vary with these different arrangements and so may be affected to any desired extent.

Figure 6:
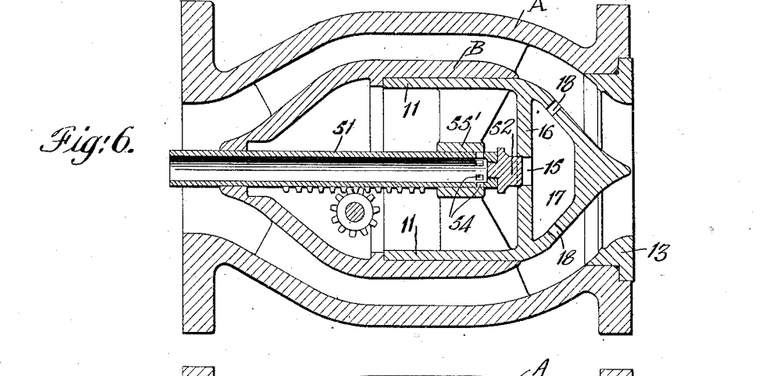

A close control of the plunger is attained by the modification shown in Fig. 6 where the bearing 55' is spaced with relation to partition 16 at such a distance that both the entrance of pressure through ports 54 and the discharge of pressure through port 15 may be simultaneously cut off as shown. It is obvious that the slightest motion of the pilot valve 52 forward will immediately introduce full pipe line pressure behind the plunger, the volume increasing as the ports 54 are opened wider and wider. On the other hand, starting with the position shown, the slightest movement of the pilot valve 52 backward will exhaust pressure from inside the plunger in increasing volume, no pipe line pressure whatever being meanwhile admitted except what may leak in through the fit around the plunger.

Figure 7:
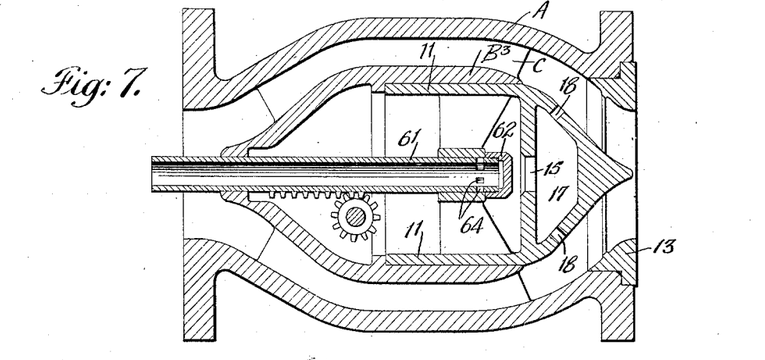

Fig. 7 shows another modification in which the lap or lost motion in both directions has been dispensed with and the ports 64 of stem 61 are practically uncovered before the discharge through port 15 is appreciably diminished by valve 62. This design also may be proportioned so as to permit both inlet ports 64 and outlet port 15 to be wide open at the same time or to permit only one port to be wide open at a time.

Figure 8:
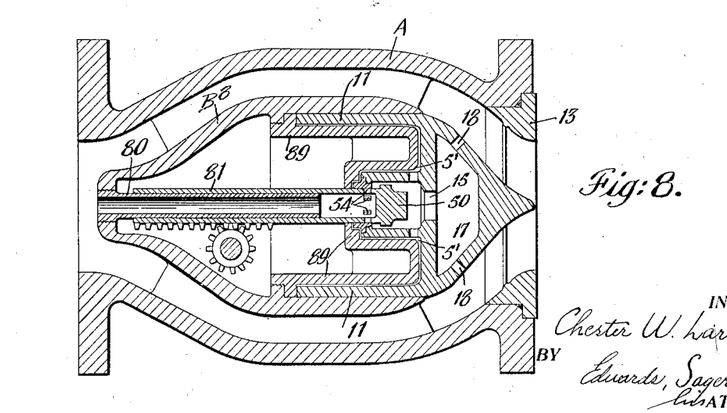

Fig. 8 shows a telescopic tube 80 for introducing pipe line pressure to the hollow pilot valve stem 81 without running the pilot valve stem out through the back end of the internal cylinder. Fig. 5 shows that the pilot valve stem of that design must necessarily protrude some distance in the wide open position and this might be objectionable on account of making it difficult to insert the valve in a pipe line already made up where it would have to be dropped between two fairly close fitting flanges. With the arrangement of Fig. 8 this objection is overcome, the tube 80 being fixed in the internal cylinder and telescoping within the pilot valve stem 81. This combination could, of course, be used with Figs. 5, 6 or 7.

Another new feature of Fig. 8 could also be incorporated in Figs. 1, 2 and 4, 5, 6 and 7 with the telescopic pilot valve. This feature consists of a bulkhead 89 secured in desired manner to the internal cylinder $B^8$ and following fairly close to the inside contour of the plunger, however the latter may be shaped and having a sliding fit around the outside of the hollow valve stem 81. The object of this bulkhead 89 is to diminish the volume of space 5' contained between it and the plunger. This is of value in a gas or steam valve or where the valve is used with a liquid and more or less air or gas of some sort might be expected to be present. Ordinarily its chief value would be in a steam valve or a valve handling some expansive medium. It is obvious that erratic movements of the plunger of a gas valve occur entirely as a result of the expansion or contraction of the volume of gas, the pressure of which is controlled by the pilot valve. In the ordinary valve of this type the movement of the pilot valve varies the pressure of the whole contents of the plunger and the internal cylinder and if these parts contain a gas this whole volume tends to expand or contract as a result of the movement of the pilot valve and also as a result of any changes of pressure on the outside nose of the plunger. The larger the volume, of course the greater the movement of the plunger which takes place as a result of a given pressure change either inside or outside of the plunger. For example, if the pilot valve opens a little too much while the plunger is making its opening stroke and drops the pressure inside the plunger a little more than it should to balance the pressure outside the plunger, the plunger will move until the gas inside the plunger has been sufficiently compressed and its pressure consequently increased to the point where it balances the outside forces. Therefore if the volume of gas inside the plunger is relatively large the motion of the plunger before a state of balance is reached will be greater than it would have been if the volume of gas to be compressed had been small.

The above example refers to the effect of an involuntary movement of the plunger with respect to the pilot valve when the pilot valve is for the moment considered to be stationary. The same considerations, however, apply to the movement of the pilot valve in its effort to induce a movement of the plunger. If, for instance, the pilot valve is opened for the purpose of opening the plunger it produces a drop of pressure inside the plunger. This pressure drop results from the discharge of gas through the pilot valve. The plunger, however, does not follow the pilot valve open in proportion to the volume of gas which has been discharged through the pilot valve as would be the case if we were dealing with a liquid instead of a gas. In the case of a gas, however, the volume tends to increase as a result of the expansion due to the pressure drop at the same time that the discharge of the pilot valve tends to reduce the volume. One offsets the other to a certain extent and it is obvious that the motion of the plunger will be more responsive the smaller the volume of gas, which is free to expand inside the plunger.

While the various constructions of the pilot valve have been described in connection with a port 15 communicating with the fluid way through a chamber 17 and orifices 18, these pilot valves are not confined to this combination but may be used with a port opening directly with the fluid way and extending, for instance, through the tip end of the valve plunger. Also if a bulkhead is utilized such as 89 in Fig. 8 it is not essential to seal chamber 5 against the free admission of pressure from the conduit. The pressure in chamber 5 has no function in the operation of the valve and hence may communicate freely with the conduit if, for any reason, it may be advantageous to so arrange it.

I claim:

1. A valve for a fluid way comprising a casing having a contracting portion, a valve plunger having a tapering end portion seating against the contracting portion of said casing and an internal chamber portion, means forming a port through which fluid is adapted to flow relatively freely under certain conditions from the fluid way to said internal chamber whereby the latter is subjected to the pressure of the fluid way, and means for varying the pressure in said chamber comprising an auxiliary chamber partitioned off from said first mentioned chamber by a partition moving with said plunger, said auxiliary chamber being connected to the fluid way by a plurality of orifices through the tapering portion of said plunger.

2. A valve for a fluid way comprising a casing having a contracting portion, a valve plunger having a tapering end portion seating against the contracting portion of said casing and an internal chamber portion subjected to the pressure of the fluid way, and means for varying the pressure in said chamber comprising an auxiliary chamber formed by a partition moving with said plunger and partitioned off from said first mentioned chamber, said auxiliary chamber being connected to the fluid way by a plurality of orifices through the tapering portion of said plunger, said orifices being so disposed in said tapering portion that transmission of pressure fluctuations between said auxiliary chamber and fluid way are relatively restricted.

3. A valve for a fluid way comprising a casing having a contracting portion, a valve plunger having a tapering end portion seating against the contracting portion of said casing and an internal chamber portion subjected to the pressure of the fluid way, and means for varying the pressure in said chamber comprising an auxiliary chamber partitioned off from said first mentioned chamber by a partition moving with said plunger, said auxiliary chamber being connected to the fluid way by a plurality of orifices through the tapering portion of said plunger and opening substantially at right angles to the flow.

4. A valve for a fluid way comprising a casing having a contracting portion, a valve plunger having a tapering end portion of generally conical form seating against the contracting portion of said casing and an internal chamber portion subjected to the pressure of the fluid way, a connecting passage for varying the pressure in said chamber to control the movement of the valve plunger comprising an opening through the solid tapering portion of the valve plunger and spaced from the end thereof, and valve means controlling said connecting passage, the end of the plunger terminating freely in the fluid way.

5. A valve for a fluid way comprising a casing having a contracting portion, a valve plunger having a tapering end portion of generally conical form seating against the contracting portion and an internal chamber portion subjected to the pressure of the fluid way, a connecting passage for varying the pressure in said chamber to control the movement of the valve plunger comprising an opening through the solid tapering portion of said plunger spaced from the end thereof and directed substantially at right angles to the flow in the fluid way, and valve means for controlling said connecting passage.

6. A valve for a fluid way comprising a casing having a contracting portion, a valve plunger having a tapering end portion seating against the contracting portion of said casing and an internal chamber portion subjected to the pressure of the fluid way, a connecting passage for varying the pressure in said chamber to control the movement of the valve plunger comprising an opening through the tapering portion of said plunger spaced from the end thereof and directed substantially at right angles to the flow in the fluid way, and valve means for controlling said connecting passage comprising a partition member having a port and a pilot valve moving to restrict the flow through said port.

7. A valve for a fluid way comprising a casing having a contracting portion, a valve plunger having a tapering end portion seating against the contracting portion of said casing and an internal chamber portion subjected to the pressure of the fluid way, a connecting passage for varying the pressure in said chamber to control the movement of the valve plunger comprising an opening through the tapering portion of said plunger spaced from the end thereof and directed substantially at right angles to the flow in the fluid way, and valve means for controlling said connecting passage comprising a partition member having a port and a pilot valve having a portion movably extending through said port to restrict the flow therethrough.

8. A valve for a fluid way comprising a casing having a contracting portion, a valve plunger having a tapering end portion seating against the contracting portion of said casing and an internal chamber portion subjected to the pressure of the fluid way, a connecting passage for varying the pressure in said chamber to control the movement of the valve plunger comprising an opening through the tapering portion of said plunger spaced from the end thereof and directed substantially at right angles to the flow in the fluid way, and valve means for controlling said connecting passage comprising a partition member having a port and a pilot valve having a portion movably extending through said port to restrict the flow therethrough and a valve shoulder finally seating against said port to close it.

9. A valve for a fluid way comprising a casing having a contracting portion, a valve plunger having a tapering end portion seating against the contracting portion of said casing and an internal chamber portion subjected to the pressure of the fluid way, and means for controlling the pressure in said chamber comprising a port connecting said chamber to the fluid way and a pilot valve having a portion movably extending through said port to restrict the flow therethrough in one position and withdrawn therefrom in another position.

10. A valve for a fluid way comprising a casing having a contracting portion, a valve plunger having a tapering end portion seating against the contracting portion of said casing and an internal chamber portion subjected to the pressure of the fluid way, and means for controlling the pressure in said chamber comprising a port connecting said chamber to the fluid way and a pilot valve having a portion movably extending through said port to restrict the flow therethrough in one position and withdrawn therefrom in another position and a valve shoulder seating against said port to close it.

11. A valve for a fluid way comprising a casing having a contracting portion, a valve plunger having a tapering end portion seating against the contracting portion of said casing and an internal chamber portion subjected to the pressure of the fluid way, and means for controlling the pressure in said chamber comprising a port connecting said chamber to the fluid way and a pilot valve having a portion movably extending through said port to restrict the flow therethrough in one position and withdrawn therefrom in another position and a valve shoulder seating against said port to close it, said pilot valve being adapted to engage and move said valve plunger by mechanical pressure.

12. A valve for a fluid way comprising a casing having a contracting portion, a valve plunger having a tapering end portion seating against the contracting portion of said casing and an internal chamber portion subjected to the pressure of the fluid way, and means for varying the pressure in said chamber to control the movement of said valve comprising a port connected to the fluid way and a pilot valve for said port having actuating means and a dash pot connection to the plunger valve.

13. A valve for a fluid way comprising a casing having a contracting portion, a valve plunger having a tapering end portion seating against the contracting portion of said casing and an internal chamber portion subjected to the pressure of the fluid way, and means for varying the pressure in said chamber to control the movement of said valve comprising a port connected to the fluid way and a pilot valve for said port having actuating means and a dash pot connection to the plunger valve consisting of a piston member on the pilot valve working in a cylinder moving with the valve plunger.

14. A valve for a fluid way comprising a casing having a contracting portion, a valve plunger having a tapering end portion seating against the contracting portion of said casing and an internal chamber portion subjected to the pressure of the fluid way, and means for varying the pressure in said chamber to control the movement of the valve plunger comprising a port connected to the fluid way and a pilot valve having a portion movably extending through said port to restrict the flow therein, said pilot valve having a dash pot connection to the valve plunger.

15. A valve for a fluid way comprising a casing having a contracting portion, a valve plunger having a tapering end portion seating against the contracting portion of said casing and an internal chamber portion subjected to the pressure of the fluid way, and means for varying the pressure in said chamber to control the movement of the valve plunger comprising a port connected to the fluid way and a pilot valve having a portion movably extending through said port to restrict the flow therein, said pilot valve having a dash pot connection to the valve plunger comprising a piston on the pilot valve working in a cylinder connected to said plunger.

16. In a valve structure the combination with an outer conduit casing and a fixed member of generally cylindrical form, of a plunger slidably mounted with relation to said fixed member and having a tapered portion seating against said casing, means for admitting fluid to the interior of said fixed member, a partition carried by said plunger to form a separate front chamber of substantial volume and having an opening for flow between the same and said interior, and a passage from said chamber to the fluid way, the relative size between said chamber and passage way being such that change of pressure in said chamber may lag behind changes of fluid way pressure with which said chamber has communication.

17. In a valve structure the combination with an outer conduit casing and fixed member of generally cylindrical form, of a plunger slidingly mounted with relation to said fixed member and having a tapered portion seating against said casing, means for admitting fluid to the interior of said fixed member, a partition carried by said plunger to form a separate front chamber and having an opening for flow from said interior, a valve at the rear of said partition for controlling said opening to regulate the pressure in said interior, and means for discharging fluid from in front of said partition, said latter means including ports disposed in the plunger nose at a point remote from the end of the tapered portion whereby pressure fluctuations substantially at said end will not be transmitted to said chamber.

18. In a valve structure the combination with an outer conduit casing and fixed member of generally cylindrical form, of a plunger slidingly mounted with relation to said fixed member and having a tapered portion seating against said casing, means for admitting fluid to the interior of said fixed member, a partition carried by said plunger to form a separate substantially enclosed and enlarged front chamber whereby pressure may be maintained throughout an appreciable interval of time even while pressure on the outside of said chamber is below chamber pressure, said chamber having an opening for flow from said interior, and a valve at the rear of said partition for controlling said opening and having a lost motion connection to said plunger to regulate the pressure in said interior.

19. A valve for a fluid way comprising a casing having a contracting portion, a valve plunger having a tapering end portion seating against the contracting portion of said casing, and an internal chamber portion, a passageway in said tapering portion permitting communication between the fluid way and said chamber while the valve plunger is normally held in its fully open position, and so positioned in said tapering portion that transmission to said chamber of pressure fluctuations in the fluid way due to change of flow velocity will be less than the pressure fluctuations in the fluid way adjacent the end of the plunger, and valve mechanism disposed within said chamber for controlling fluid flow through said passageway to said chamber.

20. A valve for a fluid way comprising a casing having a contracting portion, a central hollow member forming a chamber, a valve plunger having a nose seating against the contracting portion and carried by said member, and valve mechanism for controlling fluid in said chamber, said valve mechanism including means forming a port, a valve for said port, and a dash-pot for controlling relative movement between said port and valve.

21. A valve for a fluid way comprising a casing having a contracting portion, a valve plunger having a nose seating against the contracting portion, means forming a fluid chamber for controlling the plunger, a valve mechanism for controlling fluid therein; said valve mechanism including a port, a valve, and a dash-pot for controlling relative movement between said port and valve, and means whereby said dash-pot is operated by movement of the plunger.

22. A valve for a fluid way comprising a casing having a contracting portion, a valve plunger seating against the contracting portion, means forming a fluid chamber for controlling the plunger, a valve mechanism for controlling fluid therein; said valve mechanism including a valve, and a dash-pot for controlling relative movement between said port and valve; said dash-pot including piston and cylinder elements, one of which is directly connected to and movable with said plunger.

23. A valve for a fluid way comprising a casing having a contracting portion, a valve plunger having a tapering end portion seating against the contracting portion of said casing and an internal chamber, means forming a chamber of substantial capacity between the nose of said plunger and said internal chamber, means permitting fluid communication between said chambers to effect plunger operation, and a passage way in the tapering portion of said plunger to permit communication between the fluid way and said second chamber, said second chamber being of such volume that a substantially uniform operation of the valve may be had irrespective of pressure fluctuations adjacent the plunger nose.

24. In a valve of the plunger type, an outer casing, an inner valve member supported centrally therein, and composed of a stationary part and a movable plunger slidingly engaging the same so as to form a smooth annular fluid passageway between said plunger, stationary part and outer casing, and said plunger normally closing in the direction of normal flow, pressure operated means for effecting opening and closing movement of the plunger and including a pair of chambers to and from each of which pressure is adapted to be supplied and exhausted, a pressure supply pipe having an inlet opening communicating with the upstream side of the valve and located on a line with substantially the center of the valve, and means whereby pressure is supplied from said pipe to one of said chambers, including valve mechanism adapted to effect variable control of fluid flow through said central supply pipe thereby to control operation of said plunger.

CHESTER W. LARNER.